Patented Jan. 28, 1930

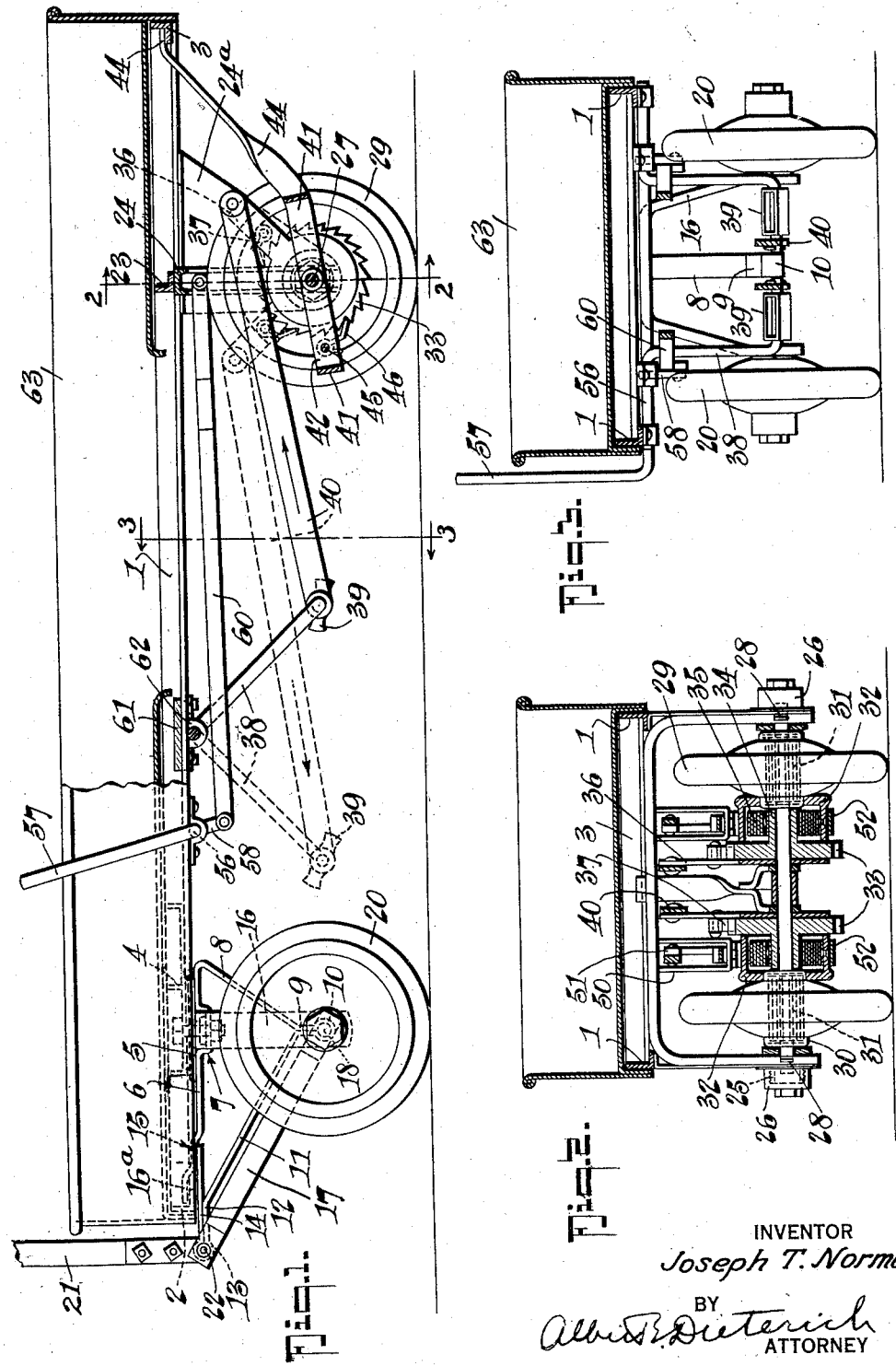

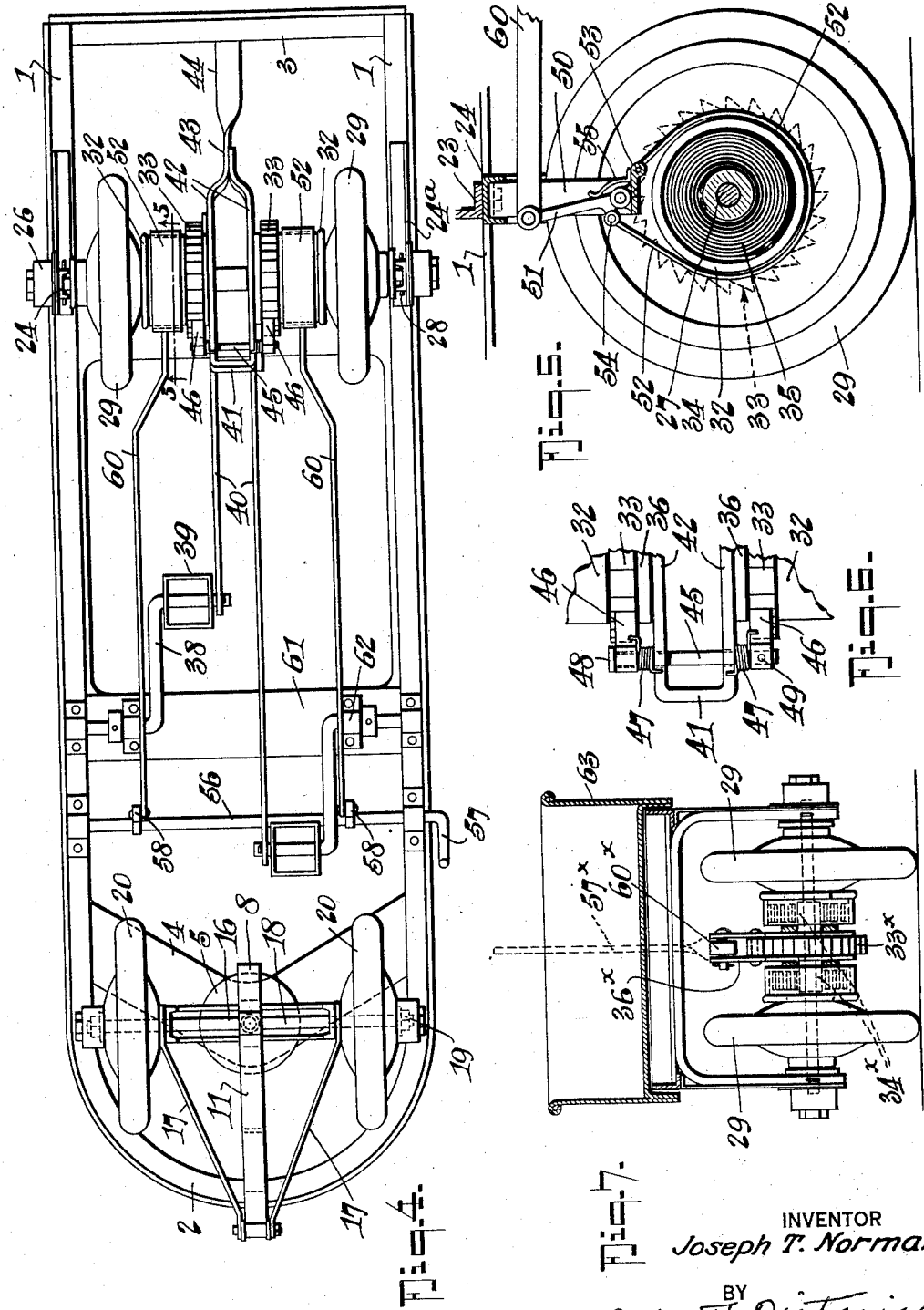

1,745,111

UNITED STATES PATENT OFFICE

JOSEPH T. NORMAN, OF FREDERICK, MARYLAND, ASSIGNOR TO THE NORMAN MANUFACTURING COMPANY, OF FREDERICK, MARYLAND, A CORPORATION OF MARYLAND

WAGON

Application filed December 5, 1928. Serial No. 323,934.

My invention has for its object to provide a new and useful construction of wagon which is particularly adapted for children's use and in which provision is made whereby the wagon may be propelled through the medium of a pedal or hand lever mechanism including provisions for applying a continuous torque to the driving wheels.

Further, the invention has for its object to provide a wagon of the kind referred to that can be ruggedly constructed, yet will be inexpensive to manufacture and will withstand the hard usage usually given to similar structures by children.

Further, it is an object to provide a wagon whose driving mechanism includes spring power with pawl and ratchet winding mechanism operated by the user, such mechanism being of a construction so that when the spring motor is fully wound the pawl and ratchet mechanism will impart, through the wound spring, a direct application of power to the drive shaft.

Still further it is an object to provide a brake device applied directly to one or both of the spring motor housing drums, the latter being rigid with the driving wheels.

Other objects will in part be obvious and in part be pointed out hereinafter.

To the attainment of the aforesaid objects and ends, my invention consists in the novel details of construction and in the combination, connection and arrangement of parts, hereinafter more fully described and then pointed out in the claims.

In the drawings:—

Figure 1 is a side elevation and part vertical longitudinal section of a wagon embodying my invention.

Figure 2 is a cross section on the line 2—2 of Figure 1.

Figure 3 is a cross section on the line 3—3 of Figure 1.

Figure 4 is an inverted plan view of the structure shown in Figure 1.

Figure 5 is a detail vertical section on the line 5—5 of Figure 4.

Figure 6 is a detail inverted plan view of a portion of the back stop pawl carrier and its back stop pawls.

Figure 7 is a cross section looking forwardly of the wagon taken at a place just to the rear of the driving wheels and illustrating a modified embodiment of my invention.

In the drawings in which like numerals and letters of reference designate like parts in all of the figures, it will be noted that the wagon embodies a frame composed of parallel side bars 1 preferably L section connected at the front by an arcuate portion 2 and at the rear by a transverse connection 3.

At the front the wagon is provided with a cross brace and an upper fifth member 4, this member being preferably of V shape in plan with the point of the V directed forwardly so that impacts in the forward running of the vehicle will not bend the brace 4.

A lower fifth member 5 cooperates with the member 4 and is itself rigidly secured to a draft element consisting of a horizontal portion 6 preferably of flat bar, this portion having a recess bent into it as at 7 to straddle over the upper horizontal portion of the channel member 16 that constitutes the front wheel carrying yoke. The draft member referred to also embodies the downwardly and forwardly extending portion 8, the short vertical portions 9, the tubular axle bearing portions 10, the forwardly and upwardly extending portion 11, the upper horizontal portions 12 and 14, the tubular front end 13 to receive the bolt 22 that connects the tongue 21 to the draft member. The portion 14 and the portion 6 lie in the same plane. The portion 6 is extended upwardly and over the portion 14 as at 15 to which it is permanently secured by spot welding or otherwise and terminates in an off-set front end 16ª between which and the portion 14 lies the horizontal component of the L-shaped arcuate portion 2, see Figure 1. In general the draft member numbered 6 to 16ª inclusive corresponds in purpose and function to the draft plate 15 of my former Patent No. 1,627,109, issued May 3, 1927.

Diagonal brace bars 17 extend from the extremities of the yoke 16 to the point of connection of the tongue and are secured to the bolt 22 as shown, thus bracing and maintaining the draft member 6 to 16ª in a plane normal to the axle 18 and midway between the wheels. The front axle 18 has its ends threaded and to these threaded ends are secured the hub-cap-nuts 19 which hold the axle in place. The front wheels 20 are loosely mounted on the axle 18 and turn independently of one another.

Near the rear end of the wagon is a cross angle brace 23 connecting the sides 1 and yoke 24 having bearings for the rear axle 27, the rear axle being pinned to the yoke by pins 28 as indicated. 24ª designates brace plates secured to the bars 1 and having hub cap bosses 25 to which the hub caps 26 of the rear structure are threaded. The rear wheels 29 turn freely preferably on roller bearings 31 on the axle 27, and have hubs 30 as best shown in Figure 2 of the drawings.

32 designates spring motor housings fitted over the inner ends of the hubs 30 and permanently secured thereto by spot welding or they may be made as an integral part of the wheel. Ratchet wheels 33 having hubs 34 are mounted to turn freely on the shaft 27 and lie up against the open sides of the housings 32 to constitute closures therefor, the hubs 34 projecting into the housings 32 as best shown in Figure 2 of the drawings. Within the housings and between the hubs 34 and the peripheries of the housings are located the power springs 35. These springs have one end each attached to the ratchet hub 34, and the other end of each attached to the inner periphery of the housing 32.

Pawl carrying levers 36 having operating pawls 37 to engage the ratchets 33 are rockably mounted on the shaft 27 adjacent the respective ratchet wheels 33. These levers 36 are connected by connecting rods 40 to the pedal hangers 38, the latter having the pedals 39 as shown. The hangers 38 are mounted in bearings 62 on a cross brace 61 toward the front of the wagon.

41 designates a back check pawl carrier mounted loosely on the shaft 27 and comprising the parallel bar portions 42 which are united at 43 and one of which is twisted and extends at 44 to engage with the back bar 3 of the wagon frame so that the carrier 41 will always be held in a definite position.

A back check pawl rod having a head 48 passes through apertures in the parallel sides 42 and carries a loose back check pawl 46 which engages one of the rigid wheels 33 and a second back check pawl 46 which is pinned at 49 to the rod 45, the rod having a head 48 to retain the first pawl 46 against coming off. Back check pawl springs 47 are provided to hold the pawls 46 in engagement with the respective ratchet wheels 33.

Above the rear axle is located a brake carrying bracket 50 on which is rockably mounted a bell crank lever 51 that is connected by a rod 60 with the rock shaft 56 of the brake operating lever 57 through the medium of the short operating levers 58, it being understood that there may be one brake unit for each ratchet hub 34.

The bell crank lever 51 is connected at 54 with one end of the brake strap 52 that passes around the housing 32, the other end of the brake band 52 being anchored at 53 to the bracket 50. Brake release springs 55 of any suitable type may be provided to release the tension of the brake when the lever 57 is not being applied. A suitable body 63 is mounted on the frame 1.

Instead of constructing the driving mechanism as illustrated in Figures 1 to 4 inclusive the modification of the invention shown in Figure 7 may be employed and by reference to this figure it will seen that the rear wheels 29 are brought closer together and in lieu of the two separate ratchet wheels 33 a single ratchet wheel 33ˣ with double hub 34ˣ is provided. The rocking pawl carrying levers 36ˣ are connected together to operate as one and through a connecting rod 60ˣ they are joined with a hand lever 57ˣ by means of which the proper driving motion may be imparted to the ratchet wheel 33ˣ by hand operation instead of foot operation as in the preceding form. Otherwise, the structure of the modification of Figure 7 is essentially the same as that of the first embodiment of the invention.

It will be seen that with either embodiment of my invention the user operating either the pedals or the hand operating levers can store up energy in the power springs 35 to impel the vehicle on its course. When the vehicle is encountering an up-grade for example and the power of the springs is not sufficient to impel the vehicle, the direct application of power through the complete winding of the springs comes into play and the vehicle is driven as a direct drive.

Other modifications of the invention than have herein been disclosed may, of course, be made without departing from the spirit of my invention or the scope of the appended claims.

What I claim is:

1. In wagons, a frame; front and rear wheeled supports for the frame; the rear wheeled support comprising an axle, an axle carrying yoke and wheels journalled on said axle; a ratchet wheel journalled on said axle and having a hub; a motor spring housing carried by one of said wheels and embracing said ratchet wheel hub; a motor spring located within said housing and having its ends respectively attached to said housing and hub; a back check pawl carrier; a pawl carrying rocking lever, and means to oscillate said pawl carrying rocking lever.

2. In wagons, a frame; front and rear wheeled supports for the frame; the rear wheeled support comprising an axle, an axle carrying yoke and wheels journalled on said axle; a ratchet wheel journalled on said axle and having a hub; a motor spring housing carried by one of said wheels and embracing said ratchet wheel hub; a motor spring located within said housing and having its ends respectively attached to said housing and hub; a back check pawl carrier mounted on said axle and engaging said frame; a pawl carrying rocking lever, and means to oscillate said pawl carrying rocking lever.

3. In wheeled vehicles, a frame; an axle; an axle carrier secured to said frame; an axle mounted on said carrier; a pair of wheels journalled on said axle and spaced apart; a ratchet wheel journalled on said axle and having a hub; a spring motor housing carried by one of said wheels and extending over said hub, said housing having an open end, which end is closed by said ratchet wheel, said hub extending into said housing; a flat helical spring having its ends secured to said hub and housing respectively and wound around said hub; a pawl-carrying rocking lever mounted on said shaft and having a pawl to engage said ratchet wheel; a back check pawl carrier with a pawl to engage said ratchet wheel; and manually actuated means to operate said pawl carrying lever to wind up said spring and impel the vehicle.

4. In wheeled vehicles, a frame; an axle; an axle carrier secured to said frame; an axle mounted on said carrier, a pair of wheels journalled on said axle and spaced apart; ratchet wheels journalled on said axle and each having a hub; spring motor housings carried by said wheels and receiving said hubs; motor springs in each housing having their ends fastened respectively to housings and hubs; a pawl carrying lever for each ratchet wheel; manually operated means to rock said pawl carrying levers, a back check pawl carrier common to both ratchet wheels and having back check pawls engaging said ratchet wheels.

5. In a wagon; a body frame; a rear axle supporting yoke secured to said frame; an axle secured in said yoke; side axle brace plates secured to said frame and to said yoke; wheels journalled on said axle; means spacing said wheels apart, said spacing means comprising ratchet wheels with hubs, a back check pawl carrier and pawl carrying rocking levers; motor springs in housings attached to said wheels and embracing said ratchet wheel hubs and secured to same; and means to operate said rocking levers.

6. In a wagon; a body frame; a rear axle supporting yoke secured to said frame; an axle secured in said yoke; side axle brace plates secured to said frame and to said yoke; and wheels on said axle and embraced by said yoke.

7. In wagons, a frame; front and rear wheels supporting said frame, a turning gear mounting said front wheels to said frame; a rear wheel mounting means comprising a yoke and an axle on which said wheels are carried embraced by said yoke; a spring motor associated with said rear wheels and including pawl and ratchet mechanism for winding the spring and turning the wheels; and manually operated mechanism for actuating said pawl and ratchet mechanism.

8. In wagons, an axle, a wheel journalled on said axle and having a cylindrical spring motor housing, a motor spring having one end secured to said housing and located within the housing, a ratchet wheel with hub projecting into said housing to which hub the other end of said spring is secured, a back pawl carrier with pawl associated with said ratchet wheel, a pawl carrying rocking lever associated with said ratchet wheel.

9. In wagons, a frame, a U-shaped yoke secured to said frame, side angle plates secured to said frame and yoke and extending rearwardly, an axle rigidly held by said yoke, a pair of wheels journalled on said axle and spaced apart and embraced by said yoke, and means located between said wheel for driving the same.

10. In wagons, a frame, a U-shaped yoke secured to said frame, side angle plates secured to said frame and yoke and extending rearwardly, an axle rigidly held by said yoke, a pair of wheels journalled on said axle and spaced apart, and means located between said wheel for driving the same, said means comprising motor springs connected with the wheels, at least one ratchet wheel to which said springs are connected, a back check pawl carrier, and a pawl carrying rocking lever for each ratchet wheel.

11. In wagons, a frame, a rear axle supporting yoke connected to said frame, wheels on said axle, a motor spring associated with each of said wheels, a ratchet wheel and hub associated with said wheels and springs, the springs being secured to and wound on said hubs and connected to said wheels, pawl carrying rocking levers associated with said ratchet wheels, and a back check pawl carrier journalled on said axle and engaging said frame to limit rotation in one direction, said carrier comprising parallel bar portions connected together at their extremities, a rock shaft journalled in said carrier, back check pawls and pawl springs on said rock shaft, there being one pawl for each ratchet wheel.

12. In wagons, a frame, an inverted U-shaped yoke secured to said frame intermediate the legs of the U, an axle mounted in said yoke adjacent the ends of the legs of the U, side axle brace plates secured to said frame and to the legs of said yoke, and wheels on said axle.

JOSEPH T. NORMAN.